United States Patent
Kawamura (10) Patent No.: US 8,035,759 B2
(45) Date of Patent: Oct. 11, 2011

(54) POLARIZATION CONVERSION DEVICE, POLARIZED ILLUMINATION OPTICAL DEVICE, AND LIQUID CRYSTAL PROJECTOR

(75) Inventor: Yoshiji Kawamura, Sano (JP)

(73) Assignee: Fujinon Corporation, Saitama (JP)

( * ) Notice: Subject to any disclaimer, the term of this patent is extended or adjusted under 35 U.S.C. 154(b) by 50 days.

(21) Appl. No.: 12/708,208

(22) Filed: Feb. 18, 2010

(65) Prior Publication Data
US 2010/0245690 A1 Sep. 30, 2010

(30) Foreign Application Priority Data
Mar. 26, 2009 (JP) ................. P2009-076846

(51) Int. Cl.
*G02F 1/1335* (2006.01)

(52) U.S. Cl. ........... 349/9; 349/1; 349/5; 349/8; 349/56; 349/57

(58) Field of Classification Search ........... 349/1, 5, 349/8, 9, 56, 57, 84, 96
See application file for complete search history.

(56) References Cited

U.S. PATENT DOCUMENTS

| | | | |
|---|---|---|---|
| 6,429,975 B1 * | 8/2002 | Sawai et al. | 359/634 |
| 7,046,422 B2 * | 5/2006 | Kimura et al. | 359/295 |
| 7,520,617 B2 * | 4/2009 | Kobayashi | 353/20 |

FOREIGN PATENT DOCUMENTS

| | | |
|---|---|---|
| JP | 2006-064871 A | 3/2006 |
| JP | 2008-129190 A | 6/2008 |

* cited by examiner

*Primary Examiner* — Jennifer Doan
(74) *Attorney, Agent, or Firm* — Birch, Stewart, Kolasch & Birch, LLP (57) ABSTRACT

Polarizing split layers 26 and reflection layers 27 are provided on bonding surfaces between prism rods 24*a* and 24*b*. Polarization conversion devices 25 are bonded to an emission surface from which linearly polarized light being reflected by the polarizing split layers 26 and reflected by the reflection layer 27 are emitted. The polarization conversion devices 25 are formed by bonding plural prism rods 30 with side surfaces being inclined by 45° with respect to an incidence surface. Retardation films formed of dielectric multilayers are provided between the bonding surfaces to give a phase difference of a ½wavelength to transmitted light. The retardation films and bonding borderlines 31 are inclined by 45° within a plane perpendicular to an optical axis of linearly polarized light so that an optical axis of the retardation film has an angle of 45° with respect to a polarization direction of the linearly polarized light.

20 Claims, 8 Drawing Sheets

POLARIZATION CONVERSION DEVICE, POLARIZED ILLUMINATION OPTICAL DEVICE, AND LIQUID CRYSTAL PROJECTOR

CROSS-REFERENCE TO RELATED APPLICATIONS

This application is based upon and claims the benefit of priority from Japanese Patent Application No.2009-76846 filed on Mar. 26, 2009; the entire contents of which are incorporated herein by reference.

BACKGROUND OF THE INVENTION

1. Technical Field

The invention relates to a polarization conversion device which rotates a polarization direction of linearly polarized light by 90°, a polarized illumination optical device which converts non-polarized illumination light into illumination light of linearly polarized light having a fixed polarization direction by the polarization conversion device, and a liquid crystal projector which uses the polarized illumination optical device in an illumination optical system.

2. Description of the Related Art

Various kinds of liquid crystal projectors that illuminate an image, which is displayed on a liquid crystal display panel, with light from a light source lamp for projection onto a screen are commercially available. As is known well, a liquid crystal display panel includes a liquid crystal layer having a predetermined thickness, in which liquid crystal molecules are sealed, and a polarizer and an analyzer which are disposed on an incidence surface side and an emission surface side of the liquid crystal layer, respectively. The polarizer and the analyzer are disposed so that polarization directions of them are perpendicular or parallel to each other. The polarizer and the analyzer control passage of linearly polarized light, which is incident on the liquid crystal layer, according to an orientation state of liquid crystal molecules, and adjust a light amount of linearly polarized light which is emitted through the analyzer.

On the other hand, generally, a polarization conversion device which converts non-polarized light from a light source into linearly polarized light having the same polarization direction as the polarizer of the liquid crystal display panel is used in the illumination optical system of the liquid crystal projector. As described in JP 2008-129190 A, a prism array obtained by combining a polarized beam splitter and a ½ wavelength plate is often used as such a polarization conversion device. The polarized beam splitter has a polarization split surface which transmits one of two kinds of linearly polarized light beams whose polarization directions are perpendicular to each other, and reflects the other one. The polarized beam splitter rotates the polarization direction of either one of the two kinds of linearly polarized light, which are separated on the polarization split surface, by 90° using the ½ wavelength plate and combines it with the other linearly polarized light, thereby obtaining linearly polarized light whose polarization directions are aligned.

Most of known ½ wavelength plates are formed of a film sheet using an organic material. Accordingly, if the ½ wavelength plates are used near the light source for a long time, discoloration easily occurs and the polarization conversion efficiency is deteriorated. In order to improve the thermal resistance, it has been proposed to use a birefringent crystalline substance, such as crystal, as the ½ wavelength plate. However, not only the crystal itself is expensive, but also the manufacturing cost is high because the crystal should be processed while controlling the optical axis of the crystal precisely. From this point of view, in the polarization conversion devices described in JP 2008-129190 A and JP 2006-64871 A, a ½ wavelength plate formed of a dielectric multilayer is used. In this case, there are advantages in that not only the thermal resistance is greatly improved but also the manufacturing cost is suppressed to be low.

The ½ wavelength plate used in the polarization conversion devices described in JP 2008-129190 A and JP 2006-64871 A is formed of the dielectric multilayer which is manufactured by the oblique deposition. A retardation film formed of a dielectric multilayer which is manufactured by the oblique deposition may be put into practical use up to a ¼ wavelength plate. However, if the film thickness is increased up to a level at which the retardation film can be used as a ½ wavelength plate, the retardation film becomes clouded. As a result, the transmittance would be reduced. Particularly, a reduction in transmittance at the short wavelength side is noticeable, which would adversely affect the color balance. Also, the dielectric multilayer which is manufactured by the oblique deposition tends to absorb the moisture. As a result, the optical property of the dielectric multilayer would largely change as the dielectric multilayer absorbs the moisture.

SUMMARY OF THE INVENTION

The invention has been made in view of the above circumstances, and has an object to provide a polarization conversion device, which is excellent in thermal resistance and can be manufactured at low cost and realizes a ½ wavelength plate for rotating the polarization direction of linearly polarized light by 90° by a dielectric multilayer which does not require the oblique deposition. Also, the invention also provides a polarized illumination optical device using the polarization conversion device and a liquid crystal projector.

To achieve the above objects, according to an aspect of the invention, a polarization conversion device includes a prism sheet and retardation films. The prism sheet includes a plurality of long and narrow prism rods. Each prism rod has an incidence surface, an emission surface, a first side surface and a second side surface. The incidence surface and the emission surface each other in parallel. The first side surface is juxtaposed the incident surface at an inside angle of 45°. The second side surface is juxtaposed to the emission surface at an inside angle of 45°. The first side surfaces and the second side surfaces are sequentially bonded to each other so that the plurality of prism rods are arranged in parallel. The retardation films have optical anisotropy and that are formed of dielectric multilayers being formed on either the first or second side surfaces of the prism rods bonded to each other so that normal lines of the first or second side surfaces substantially match optical axes of the retardation films. Bonding borderlines between the plurality of prism rods are inclined by 45° with respect to a polarization direction of linearly polarized light within a plane perpendicular to an incident optical axis of the linearly polarized light. The bonding borderlines are exposed on the incidence surface or emission surface side.

According to another aspect of the invention, a polarization conversion device includes a prism sheet and retardation films. The prism sheet includes a plurality of long and narrow prism rods. Each prism rod has an incidence surface, an emission surface, a first side surface and a second side surface. The incidence surface and the emission surface each other in parallel. The first side surface is continued to the incident surface at an inside angle of 45°. The second side surface is continued to the emission surface at an inside angle of 45°. The first side surfaces and the second side surfaces are sequentially bonded to each other so that the plurality of prism rods are arranged in parallel. The retardation films are formed of dielectric multilayers being formed on either the first or second side surfaces of the prism rods bonded to each other so that normal lines of the first or second side surfaces substantially match optical axes of the retardation films. The retardation films has an optical anisotropy that gives a phase difference of a ½ wavelength to transmitted light which is vertically incident from the incidence surface. Bonding borderlines between the plurality of prism rods are inclined by 45° with respect to a polarization direction of linearly polarized light within a plane perpendicular to an incident optical axis of the linearly polarized light. The bonding borderlines are exposed on the incidence surface or emission surface side. If each retardation film is configured to give a phase difference of a ¼ wavelength to the polarization direction of the transmitted light, which is incident in a similar manner, the polarization conversion device can be used as a ¼ wavelength plate.

According to further another aspect of the invention, a polarization conversion device is provided by overlapping two polarization conversion elements having the same structure. In this case, each polarization conversion element includes a prism sheet and retardation films. The prism sheet includes a plurality of long and narrow prism rods. Each prism rod has an incidence surface, an emission surface, a first side surface and a second side surface. The incidence surface and the emission surface each other in parallel. The first side surface is continued to the incident surface at an inside angle of 45°. The second side surface is continued to the emission surface at an inside angle of 45°. The first side surfaces and the second side surfaces are sequentially bonded to each other so that the plurality of prism rods are arranged in parallel. The retardation films are formed of dielectric multilayers that are formed on either the first or second side surfaces of the prism rods bonded to each other so that normal lines of the first or second side surfaces substantially match optical axes of the retardation films. The retardation films have an optical anisotropy that gives a phase difference of a ¼ wavelength to transmitted light which is vertically incident from the incidence surface. The polarization conversion elements are used so that bonding borderlines, of each polarization conversion element, between the plurality of prism rods are inclined by 45° with respect to a polarization direction of linearly polarized light within a plane perpendicular to an incident optical axis of the linearly polarized light. Thereby, the polarization conversion device rotates the polarization direction of the linearly polarized light by 90°.

The retardation film formed of the dielectric multilayer is designed based on a center wavelength which is designed in advance. When a target wavelength band expands, the retardation film generally shows a tendency that a polarization conversion efficiency decreases as a wavelength gets away from the center wavelength. However, where the configuration that two polarization conversion elements are overlapped with each other is adopted, the bonding bounderlines of the respective polarization conversion elements may be arranged by different angles with considering the spectral wavelength characteristics of the polarization conversion efficiency. For example, like a visible light band, where a high conversion efficiency is required in a wide wavelength band of 440 nm to 650 nm while the retardation film is designed with the center wavelength of near about 550 nm, one of the polarization conversion elements may be arranged so that its bonding bounderlines are inclined by an angle $\theta 1$ with respect to the polarization direction of the linearly polarized incident light, and the other polarization conversion element may be arranged so that its bonding bounderlines are inclined by an angle $\theta 2$ with respect to the polarization direction of the linearly polarized incident light, and the relationship of $2\times(\theta 1-\theta 2)\approx 90°$ may be satisfied. Furthermore, where $\theta 1$ and $\theta 2$ are set in ranges of $60°\leq \theta 1 \leq 70°$ and $15°\leq \theta 2 \leq 25°$, a high conversion efficiency can be achieved over the entire visible light.

The polarization conversion device having any of the configurations described above is suitable for use in a part of a polarized illumination optical device in an illumination optical system of a liquid crystal projector. The polarized illumination optical device includes a polarized beam splitter and the polarization conversion device. The polarized beam splitter includes a polarizing split layer on a bonding surface between prisms. The polarized beam splitter transmits one of first and second linearly polarized light beams whose polarization directions are perpendicular to each other, out of non-polarized light beams incident on the polarizing split layer. The polarized beam splitter reflects the other of the first and second linearly polarized light beams. The polarization conversion device is bonded to an emission surface of the polarized beam splitter from which the other linearly polarized light beam reflected by the polarizing split layer is emitted. Non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device. Also, the plurality of polarized beam splitters having the polarization conversion devices bonded to the emission surfaces thereof may be arranged so that the polarization conversion devices are parallel to each other on the same plane.

The above polarization conversion device is more effectively utilized when it is used in a liquid crystal projector including an illumination optical system that divides illumination light from a light source lamp using a pair of microlens arrays, in which a plurality of microlenses is arranged, and that emits the divided illumination light beams so as to be superimposed on a liquid crystal display panel. In this case, the polarized illumination optical device may be disposed just after an emission surface of the pair of microlens arrays.

With the above configurations, it is possible to obtain a polarization conversion device which is excellent in thermal resistance and can be manufactured at low cost. Moreover, when either one of the first and second linearly polarized light beams having the polarization directions perpendicular to each other is incident on the polarization conversion device, the either one can be efficiently converted into the other linearly polarized light beam. The retardation films used in the polarization conversion device can be manufactured using a normal deposition method of performing the deposition from a direction substantially perpendicular to the substrate surface. Accordingly, it is possible to obtain retardation films which have no cloudy part being apt to be generated by the oblique deposition, and which is also excellent in physical durability. Also, by using the above polarization conversion device as a polarization conversion device provided in an illumination optical system of a liquid crystal projector, linearly polarized light for illumination of a liquid crystal display panel can be obtained with high efficiency. As a result, it becomes possible to improve the contrast of a projected image.

DETAILED DESCRIPTION OF EMBODIMENTS OF THE INVENTION

Figure 1:
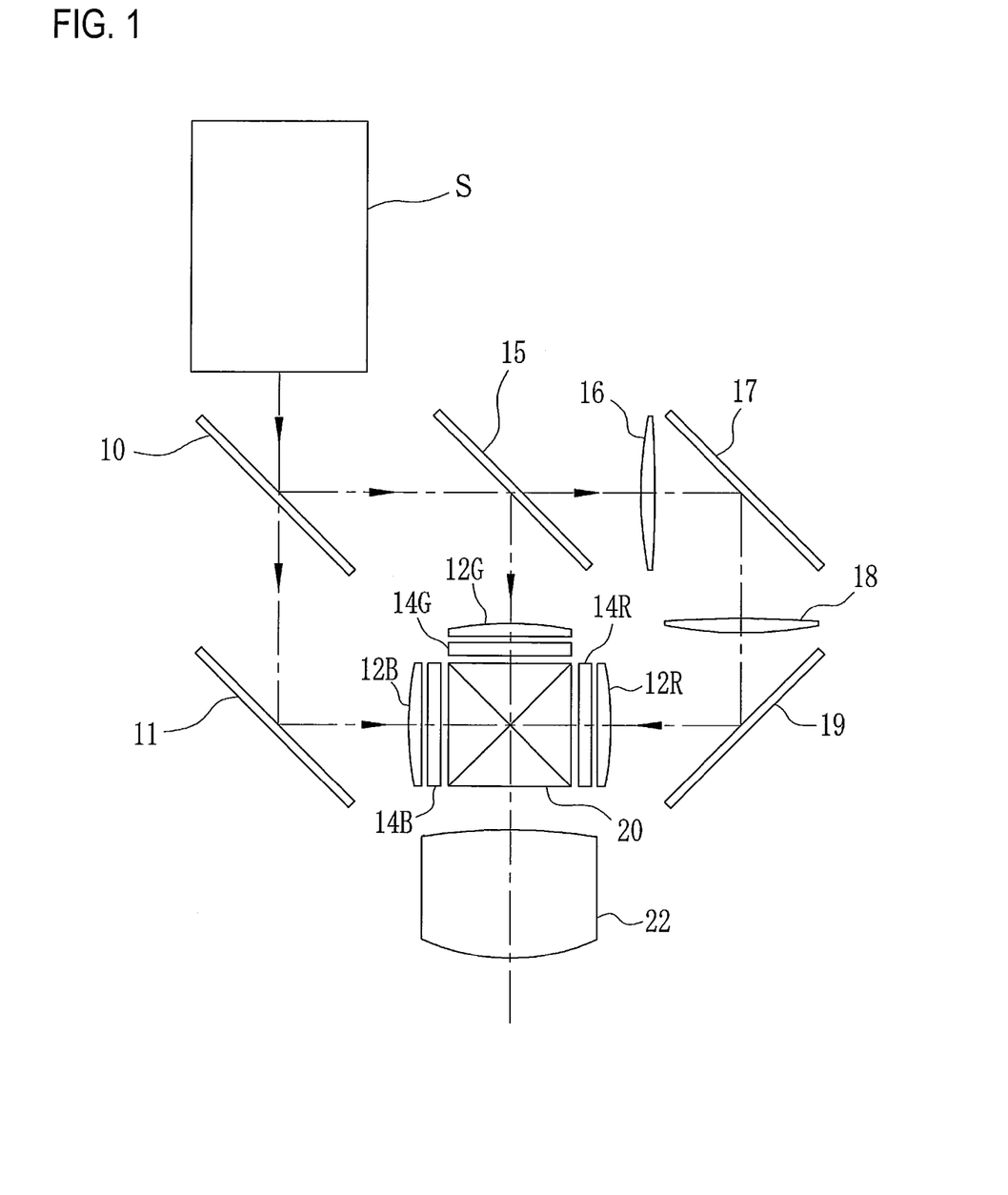
FIG. 1 is a schematic view showing main parts of an illumination optical system of a liquid crystal projector.
Figure 2:
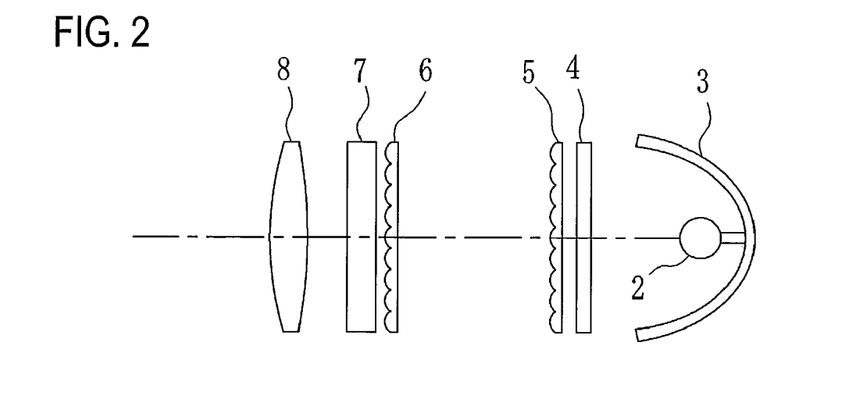
FIG. 2 is a schematic view showing main parts of a light source device of the liquid crystal projector.

An optical system of a liquid crystal projector is schematically configured as shown in FIG. 1 including a light source device S. As shown in FIG. 2, the light source device S includes a high-intensity light source lamp 2, such as an ultrahigh-pressure mercury lamp, and the light source lamp 2 is used together with a reflector 3. A filter 4 for cutting infrared light and ultraviolet light is provided on an illumination optical path. Non-polarized illumination light beams in a visible range in which various polarized light beams are mixed are incident on a first microlens array 5 as substantially parallel beams. The first microlens array 5 is obtained by arranging plural microlenses in a rectangular matrix so as to follow the rectangular shape of a liquid crystal display panel, and forms a pseudo light source corresponding to the number of microlenses equivalently on a second microlens array 6 having the same structure.

The illumination light emitted from the pseudo light source formed on the second microlens array 6 is incident on a polarized illumination optical device 7 at an incidence angle of about 5° to 6° even in the case of ambient light. The polarized illumination optical device 7 serves to separate linearly polarized light, which has a polarization direction perpendicular to the plane of the drawing paper, from the non-polarized illumination light including various polarized light beams and to make the separated linearly polarized light be incident on an illumination lens 8. The illumination lens 8 guides illumination light beams, which are emitted as linearly polarized light from the polarized illumination optical device 7 for the respective pseudo light sources, to the overall effective screens of liquid crystal display panels which are provided in a B (blue light) channel, a G (green light) channel, and an R (red light) channel for overlap, thereby uniformly illuminating the liquid crystal display panel of each channel.

The illumination light emitted from the light source device S through the illumination lens 8 is first incident on a dichroic mirror 10, as shown in FIG. 1. The dichroic mirror 10 transmits blue light and reflects the other color light beams. The blue light is incident on a field lens 12B through a total reflection mirror 11. The light beams from the pseudo light source overlap on the field lens 12B by an operation of the illumination lens 8 and uniformly illuminate the inside of the effective area of a liquid crystal display panel 14B provided behind the field lens 12B. Also, a green light beam of the color light beams reflected by the dichroic mirror 10 is reflected by the next dichroic mirror 15, and uniformly illuminates a liquid crystal display panel 14G through a field lens 12G in the same manner as described above.

A red light beam transmitted through the dichroic mirror 15 is guided to a field lens 12R through a first relay lens 16, a total reflection mirror 17, a second relay lens 18, and a total reflection mirror 19 and uniformly illuminates a liquid crystal display panel 14R from the back surface side in the same manner as described above. Since the length of the illumination optical path of the R channel is larger than those of the B and G channels, the operation of the illumination lens 8 is deteriorated in the R channel. However, the operation of the illumination lens 8 is similarly realized even in the R channel by using the first and second relay lenses 16 and 18.

By the field lenses 12B, 12G, and 12R, the liquid crystal display panels 14B, 14G, and 14R are uniformly illuminated by the linearly polarized illumination light from the back surface side without the peripheral brightness being reduced. Then, image light beams for respective channels transmitted through the liquid crystal display panels 14B, 14G, and 14R are mixed by a cross dichroic prism 20, are incident on a projector lens 22 as full-color image light, and are projected toward a screen.

Figure 3:
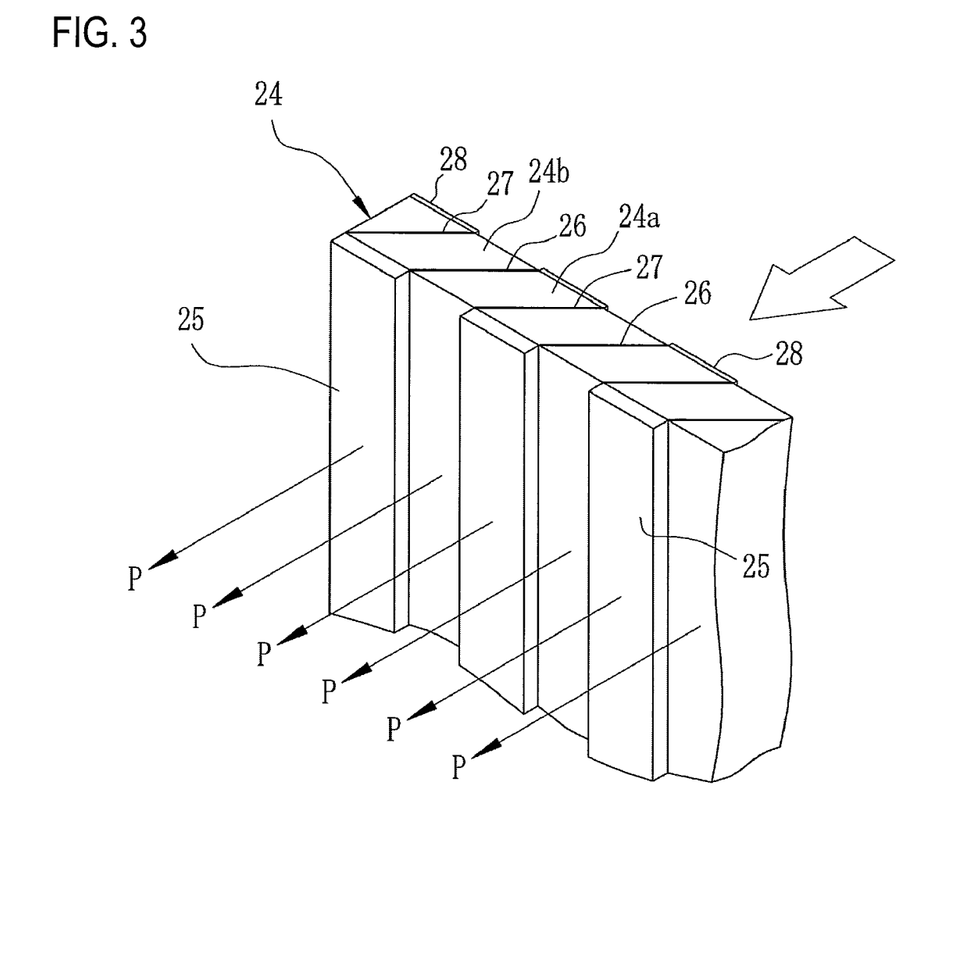
FIG. 3 is a view showing an outer appearance of a polarized illumination optical device.

The polarized illumination optical device 7 used in the light source device S has an outer appearance of a substantially rectangular plate shape as shown in FIG. 3. The polarized illumination optical device 7 is configured to include a polarized beam splitter array 24 and polarization conversion devices 25 which are bonded to a light emission surface side of the polarized beam splitter array 24 at predetermined intervals. The polarized beam splitter array 24 is formed by arranging in parallel and bonding a plurality of vertically elongated prism rods 24a and 24b having a parallelogram shape in section. On the bonding surfaces of the prism rods 24a and 24b, a polarizing split layer 26 formed of a dielectric multilayer and a reflection layer 27 formed of a metallic layer are alternately formed. The prism rods 24a and 24b have the same shape and are shaped so that the polarizing split layers 26 and the reflection layers 27 have an inclination of 45° with respect to the normal line of the incidence surface.

Among non-polarized illumination light beams which are incident almost vertically on the incidence surface (back surface side in the drawing) of the prism rod 24b, the polarizing split layer 26 transmits linearly polarized light (having a polarization direction parallel to a plane including an incident light beam and the normal line of the polarizing split layer 26) of P-polarized light component and reflects linearly polarized light (having a polarization direction perpendicular to the polarization direction of the linearly polarized light of the P-polarized light component) of S-polarized light component. The P-polarized light transmitted through the polarizing split layer 26 is emitted from the emission surface side through the prism rod 24a, while the S-polarized light reflected by the polarizing split layer 26 is reflected by the reflection layer 27 and is then incident vertically on the polarization conversion device 25. Also, a light shielding layer 28 is formed on the incidence surface side of the other prism rod 24a so that non-polarized light from the light source lamp 2 is not incident on the prism rod 24a.

The polarization conversion device 25 has a function of a ½ wavelength plate which rotates a polarization direction by 90°. Accordingly, the S-polarized light is converted into the P-polarized light while being transmitted through the polarization conversion device 25 and is then emitted from the emission surface side. By arranging the pair of prism rods 24a and 24b including the polarizing split layer 26 and the reflection layer 27 alternately and in parallel, the polarized illumination optical device 7 having the plate shape shown in the figure can be obtained. The polarized illumination optical device 7 may be disposed immediately after the emission surface of the second microlens array 6 shown in FIG. 2 so as to cover the entire emission surface.

Figure 4:
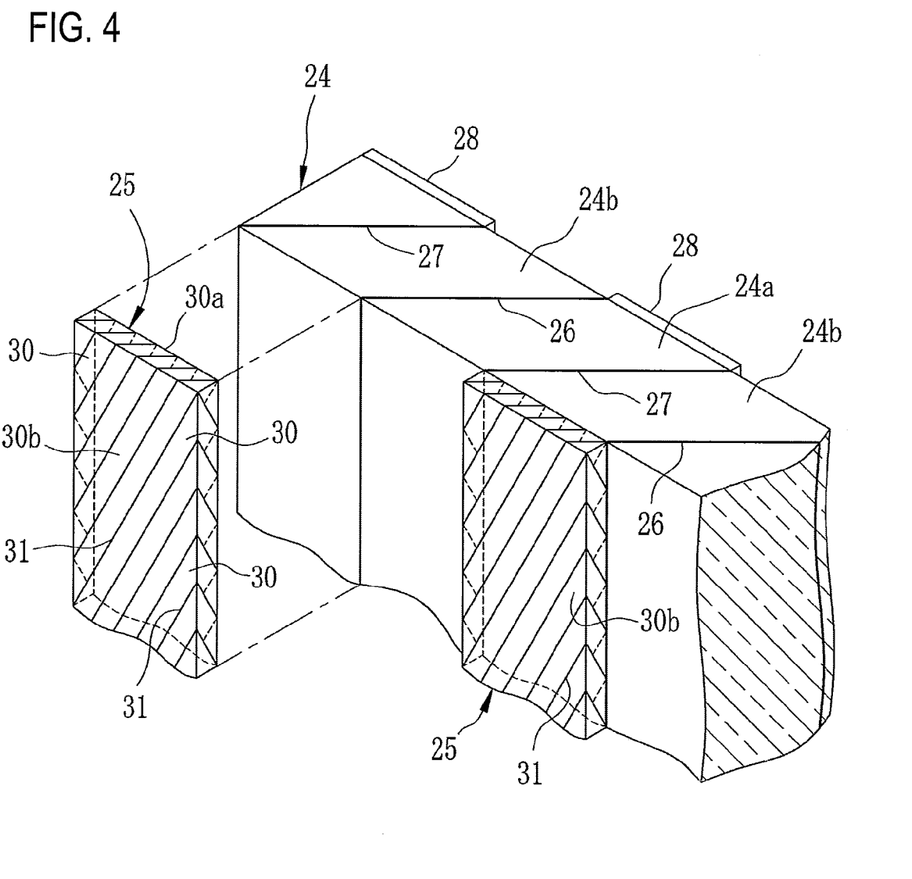
FIG. 4 is a partially broken perspective view schematically showing the structure of the polarized illumination optical device.
Figure 5:
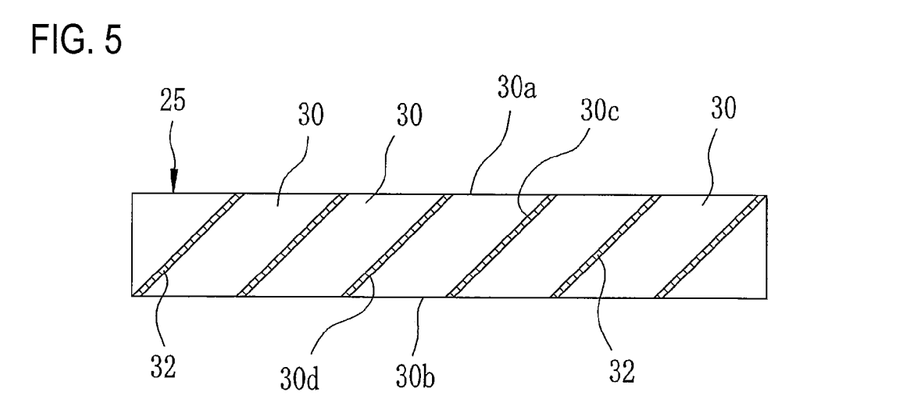
FIG. 5 is a section view showing a polarization conversion device.

Referring to FIG. 4 which shows the structure of the polarized illumination optical device 7, the polarization conversion device 25 is d in a vertically long rectangular shape so as to cover the entire emission surface of the prism rod 24b. FIG. 5 shows a section view of the polarization conversion device 25. In FIG. 5, the polarization conversion device 25 has, in section, a prism sheet shape in which parallelogram prism rods 30 are arranged in parallel like the polarizing beam splitter array 24. Each prism rod 30 has an incidence surface 30a, an emission surface 30b, a first side surface 30c continued to the incident surface 30a at the inside angle of 45°, and a second side surface 30d continued to the emission surface 30b at the inside angle of 45°. The first and second side surfaces 30c and 30d of the adjacent prism rods 30 are bonded to each other. Here, as shown in FIG. 4, each prism rod 30 is inclined so that a bonding borderline 31, which appears on the incidence surface 30a or an emission surface 30b, crosses four sides, which form a rectangular outline of the polarization conversion device 25, at 45°.

On the first side surface 30c of each prism rod 30, a retardation film 32 having an optical anisotropy is formed before the first side surface 30c is bonded to the second side surface 30d of the adjacent prism rod 30. Therefore, the retardation films 32 are interposed between all bonding surfaces between the prism rods 30, and the section of the retardation film 32 appears corresponding to the bonding borderlines 31 as shown in FIG. 4. Also, it is a matter of course that the retardation films 32 may be formed on the second side surface 30d. Since the retardation films 32 are inclined by 45° with respect to the incidence surface 30a in the section of the polarization conversion device 25 and since the prism rod 30 is inclined by 45° with respect to the four sides, which form the outline of the polarization conversion device 25, a light beam which is incident vertically from the incidence surface 30a of the polarization conversion device 25 is necessarily incident on the retardation films 32 at the angle of 45°.

The retardation films 32 may be manufactured by alternately laminating two kinds of thin dielectric layers having different refractive indices up to about 140 layers, for example, on the first side surfaces 30c. In this case, the optical thickness of each thin dielectric layer is sufficiently thin, and is equal to or smaller than 1/(ten and several) of λ/4 or λ/2 which is frequently used in a so-called optical interference thin layer. In order to form the retardation films 32, it is preferable to use a normal deposition method in which the first side surfaces 30c, on which the retardation films 32 are to be formed, substantially face two kinds of deposition sources. In this case, it is preferable to perform the deposition alternately by the deposition sources while monitoring the thickness so that two kinds of thin dielectric layers having different refractive indices are stacked. Also, it is known that the value of birefringence Δn for the optical anisotropy is determined according to a difference between refractive indices of two kinds of thin dielectric layers stacked and the film thickness ratio thereof. The retardation is determined by a product of physical film thickness d and birefringence Δn of the entire dielectric multilayer.

By performing such deposition, the retardation films 32 functioning as a uniaxial negative C plate whose optical axis matches the normal lines of the first side surfaces 30c are formed on the first side surfaces 30c. Also, by adjusting the total film thickness d in consideration of (i) the value of birefringence Δn which is set advance and (ii) the optical path length in the retardation film 32, a phase difference of a ½ wavelength can be given to a light beam which is incident vertically from the incidence surface 30a and is then transmitted through the retardation film 32. Moreover, by the film thickness adjustment of the retardation layer 32, it is also possible to give an appropriate phase difference, for example, a phase difference of a ¼ wavelength to a light beam which is incident vertically from the incidence surface 30a. This may be used as a ¼ wavelength plate. Moreover, as deposition materials used in the retardation film 32, known materials may be used. For example, $Ta_2O_5$, $Ti_2O_3$, $TiO_2$, $ZrO_2$, and $Nb_2O_3$, may be used as high refraction materials, and $SiO_2$, $MgF_2$, and $CaF_2$ may be used as low refraction materials.

Figure 6:
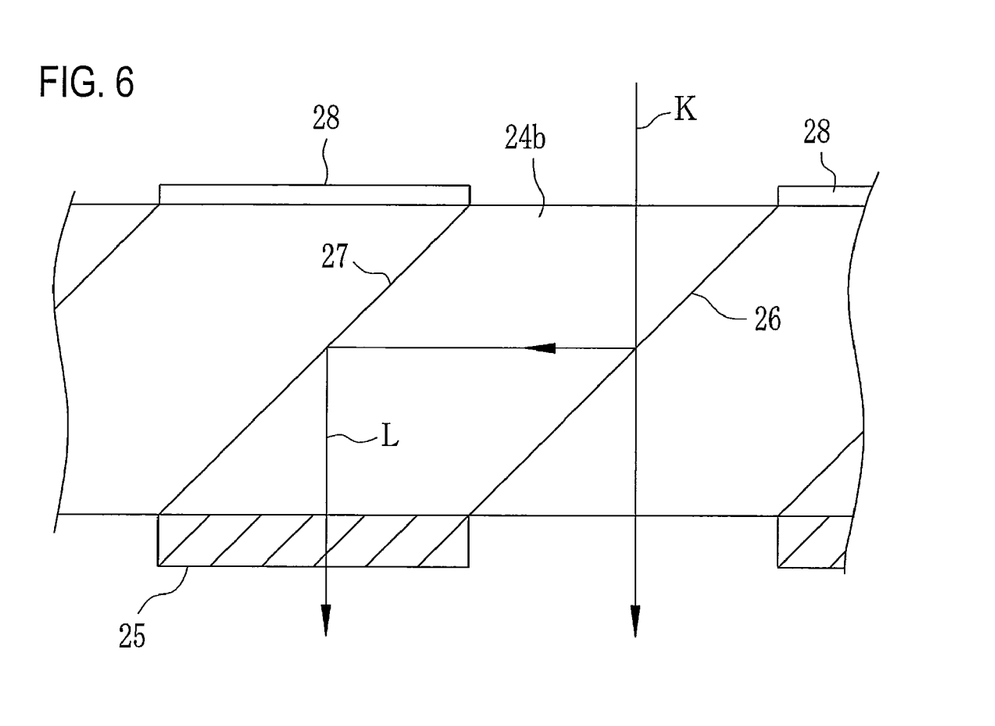
FIG. 6 is an explanatory view of an operation of the polarized illumination optical device.

The operation of the polarized illumination optical device 7 configured as described will be described below. Non-polarized illumination light, which is emitted from each of the microlenses that form the second microlens array 6 so that main beams are substantially parallel to each other, is incident on the polarized illumination optical device 7 for every microlens. As shown in FIG. 6, the illumination light, which is emitted from the microlens and is then incident substantially vertically from the incidence surface of the prism rod 24b along an incident optical axis K, is incident on the polarizing split layer 26 at an incident angle of 45°.

The polarizing split layer 26 transmits linearly polarized light of P-polarized light component among the incident illumination light, and reflects linearly polarized light of S-polarized light component by 45°. The transmitted linearly polarized light of the P-polarized light component is emitted as linearly polarized light of P-polarized light component from the emission surface of the prism rod 24b. The linearly polarized light of the S-polarized light component reflected by the polarizing split layer 26 is reflected by reflection layer 27 and is then incident substantially vertically on the polarization conversion device 25 bonded to the emission surface of the prism rod 24b.

Since the retardation films 32 used in the polarization conversion device 25 are formed of the dielectric multilayers, which are stacked on the first side surfaces 30c of the prism rods 30 in the normal direction, the optical axes of the retardation films 32 match the normal direction of each first side surface 30c. However, within a plane perpendicular to an optical axis L (parallel to the incident optical axis K) of the linearly polarized light of the S-polarized light component, the first side surface 30c is inclined by 45° with respect to the optical axis L. Accordingly, the optical axes of the retardation films 32 are inclined by 45° with respect to the polarization direction of the linearly polarized light of the S-polarized light component perpendicular to the paper of the figure. When the optical axis is taken into consideration, the linearly polarized light of the S-polarized light component is obliquely incident on the retardation films 32 by an angle of 45° equivalently.

Therefore, by adjusting the thickness of the retardation films 32 in consideration of the oblique incidence, a phase difference of a ½ wavelength can be given while the linearly polarized light of S-polarized light component is being transmitted through the retardation films 32. As a result, the polarization direction (plane of polarization) of the linearly polarized light of the S-polarized light component is rotated by 90° and then, light is emitted from the polarization conversion device 25 as the linearly polarized light of the P-polarized light component.

As described above, when illumination light from the light source lamp 2 is incident on the polarized illumination optical device 7, only the linearly polarized light of the P-polarized light component, whose polarization direction is aligned in the horizontal direction, among various polarized light beams is emitted and can be used for illumination of the liquid crystal display panels 14B, 14G, and 14R provided for the respective color channels. As is known well, since a high-intensity lamp is used as the light source lamp 2, its neighborhood reaches a considerable temperature. However, the retardation film 32 used in the polarized illumination optical device 7 is formed of an inorganic material and can be manufactured as a layer which does not require the oblique deposition and in which the thickness of each thin dielectric layer can be easily monitored. Accordingly, there are advantages that the durability is excellent and that the cost can be reduced by mass production.

Figure 7:
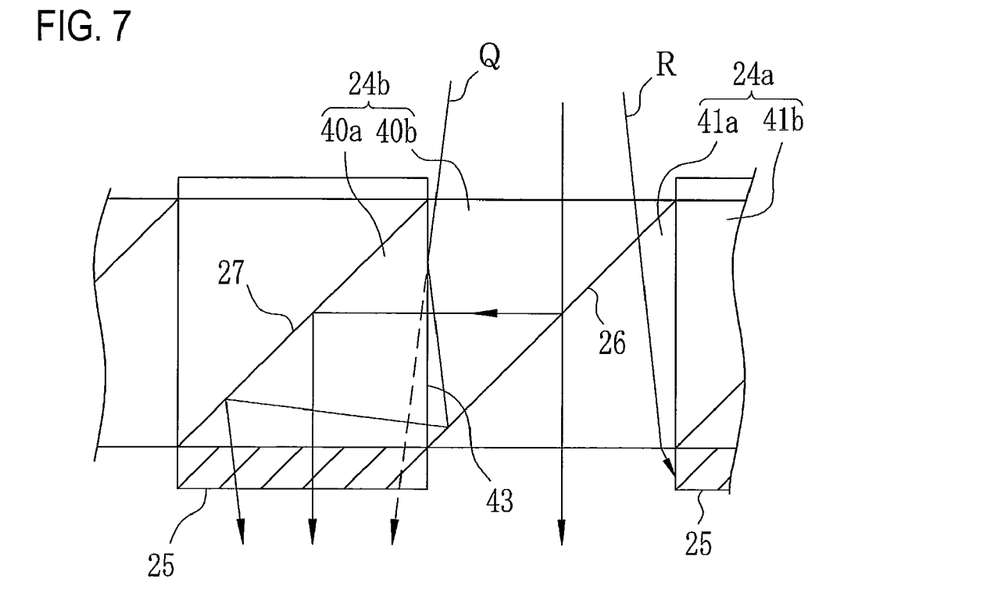
FIG. 7 is a view explaining an operation in another example of the polarized illumination optical device.

On the other hand, as shown in FIG. 7, the polarized beam splitter array 24 may be configured so that the prism rod 24b is formed by combining columnar rectangular prisms 40a and 40b and the prism rod 24a is formed by combining similar rectangular prisms 41a and 41b. Moreover, in the figure, the polarization conversion device 25, the polarizing split layer 26, and the reflection layer 27 which have the same functions as those described above are denoted by the same reference numerals.

When the polarized beam splitter array 24 having this structure is used, it is also effective to form an angle selection layer 43 on a bonding surface between the rectangular prisms 40a and 40b. For example, the angle selection layer 43 is formed by forming an SiO₂ layer, which has a refractive index of 1.46 and has about 500 nm in thickness. When light beams in a visible light wavelength range are incident at small incident angles of 0° to 10°, the angle selection layer 43 serves to transmit almost 100% of the light beams. To the contrary, when the light beams are incident at large incident angles of 80° to 90°, the angle selection layer 43 serves to reflect almost 100% of the light beams.

As described above, in the illumination optical system using the microlens array, there is also a light beam which is incident on the polarized beam splitter array 24 at the angle of divergence of about 5 to 6°. Since such light beams Q are incident on the angle selection layer 43 at large incident angles, most of the light beams Q are reflected to be incident on the polarizing split layer 26 as shown by a solid line. Then, the light beams Q are divided into the linearly polarized light of the P-polarized light component, which is transmitted through the polarizing split layer 26, and the linearly polarized light of the S-polarized light component, which is reflected by the polarizing split layer 26. Since the reflected linearly polarized light of the S-polarized light component has a small incident angle, the reflected linearly polarized light of the S-polarized light component is transmitted through the angle selection layer 43 and goes toward the polarization conversion device 25 through the reflection layer 27. Accordingly, as shown by a broken line in the figure, it is possible to prevent the non-polarized light beams K from being transmitted and emitted through the polarization conversion device 25. This is advantageous in that noise light can be reduced.

Also, when linearly polarized light of P-polarized light component, which is transmitted through the polarizing split layer 26, among light beams incident with angles like a light beam R is emitted from the emission surface of the rectangular prism rod 41a, the linearly polarized light of the P-polarized light component may be refracted in a direction as shown in the figure on an interface being in contact with air and be eclipsed on the side surface of the polarization conversion device 25. In order to prevent this, it is preferable to bond a glass plate, which has substantially the same thickness as the polarization conversion device 25 and has the same refractive index as the rectangular prism rod 41a, so as to cover the entire emission surface of the rectangular prism rod 41a and to make the emission surface of the linearly polarized light of P-polarized light component equivalently aligned with the emission surface of the polarization conversion device 25.

Figure 8A:
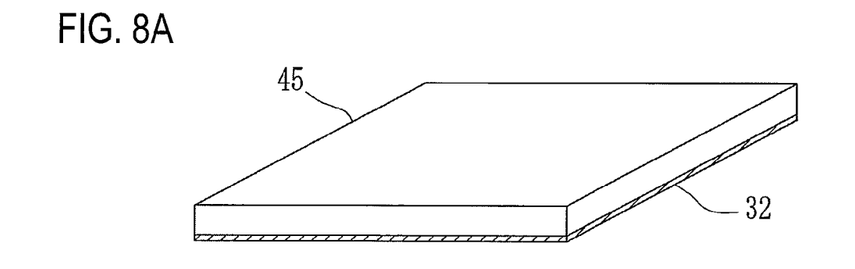
FIGS. 8A to 8D are explanatory views showing an example of a manufacturing process of the polarization conversion device.

An example of a manufacturing method of the polarization conversion device 25 is shown in FIGS. 8A to 8D. As shown in FIG. 8A, the retardation film 32 is formed on a surface of a glass plate 45, which is a material of the prism rod 30, in a normal deposition method without using the oblique deposition method. According to the capacity of the deposition facility, the retardation film 32 may be deposited collectively on the plurality of glass plates 45. The glass plates 45 obtained as described above are bonded so as to overlap each other, as shown in 8B.

Figure 8B:
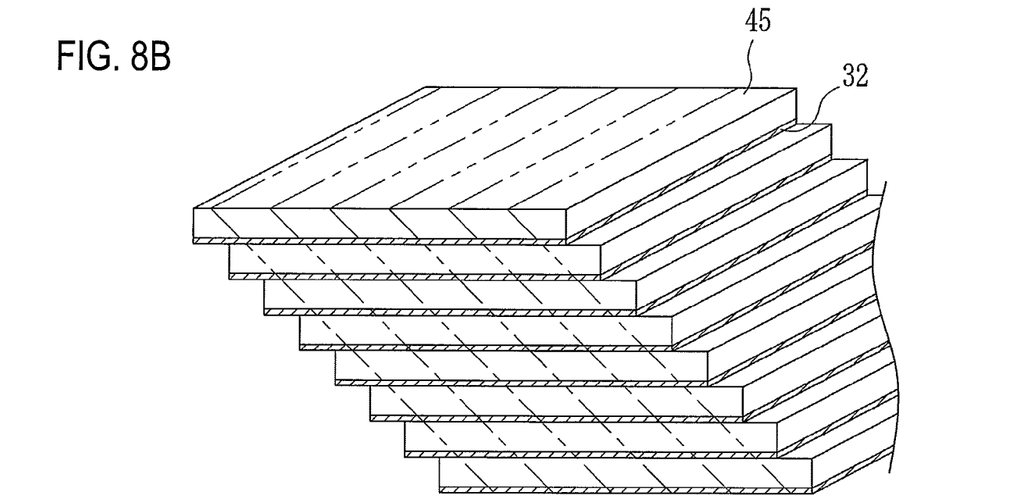
Figure 8C:
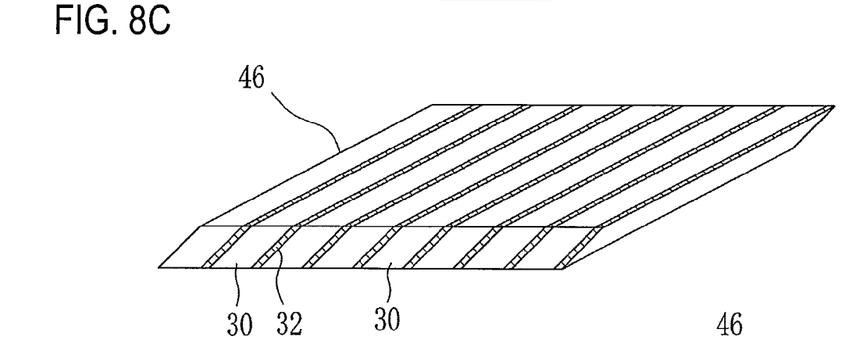

Then, the laminate body is cut according to cut lines which cross the surfaces of the glass plates 45 at 45° as shown by a two-dot chain line in FIG. 8B, and the cut surfaces are polished, thereby obtaining a prism plate 46 shown in FIG. 8C. One cut surface of the prism plate 46 becomes an incidence surface of the polarization conversion device 25, and the other surface becomes an emission surface of the polarization conversion device 25. Each cut piece of the glass plate 45 extending in a longitudinal direction is equivalent to the prism rod 30.

Figure 8D:
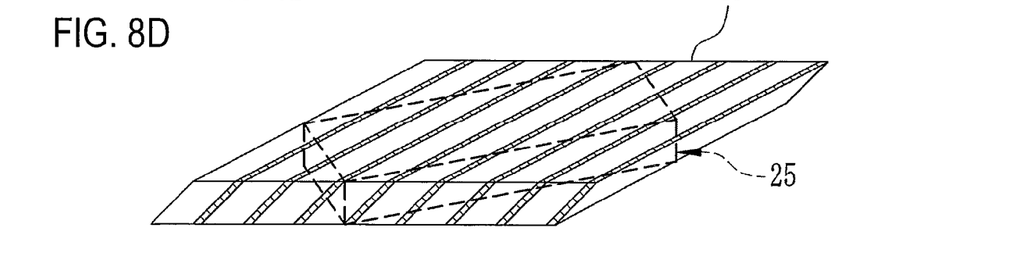

The polarization conversion device 25 can be acquired by cutting the prism plate 46 obtained as described above in a rectangle plate shape along a cut line shown as a broken line in FIG. 8D and by polishing the cut surface. The cut line shown in FIG. 8D is equivalent to the outline of the rectangular outer appearance of the polarization conversion device 25. Therefore, it is preferable that short and long sides of the cut line are set to cross the bonding borderline 31 of the prism rod 30 or the cut surface of the retardation film 32 at 45° and are cut vertically in the thickness direction of the prism plate 46.

As shown in FIG. 4, generally, the polarization conversion devices 25 used in the polarized illumination optical device 7 are used in a long, narrow, and rectangular sheet shape in many cases. Accordingly, if the polarization conversion devices 25 are cut from the prism plate 46 so that the bonding borderlines 31 have an angle of 45° with respect to the outline of the outer appearance of the polarization conversion devices 25 as described above, the optical axes of the retardation films 32 can be aligned to a direction suitable for the polarization direction of linearly polarized light only by bonding the polarization conversion device 25 to the emission surfaces of the prism rods 24b based on the outer appearance when the polarization conversion devices 25 are bonded to the emission surfaces of the prism rods 24b.

In the embodiment described above, the retardation films 32 formed on the first side surfaces 30c of the prism rods 30 function as a ½ wavelength plate with respect to linearly polarized light, which is incident vertically from the incidence surface 30a, and rotate the polarization direction of the linearly polarized light by 90°. The function as a ½ wavelength plate may also be realized by combining two ¼ wavelength plates. For this reason, in the polarization conversion devices 25 used in an embodiment shown in FIG. 9, two polarization conversion elements 25a and 25b are bonded in which retardation films each functioning as a ¼ wavelength plate are formed on the glass plates 45 instead of the retardation films 32, which are formed in order to obtain the function of a ½ wavelength plate, during the manufacturing process of the polarization conversion devices 25 shown in FIGS. 8A to 8D. Of course, only one of the polarization conversion elements 25a and 25b may be used as a ¼ wavelength plate in other applications. Also, in this case, there are advantages that the retardation films are formed of an inorganic material and can be manufactured simply and at low cost since the oblique deposition is not required.

Figure 9:
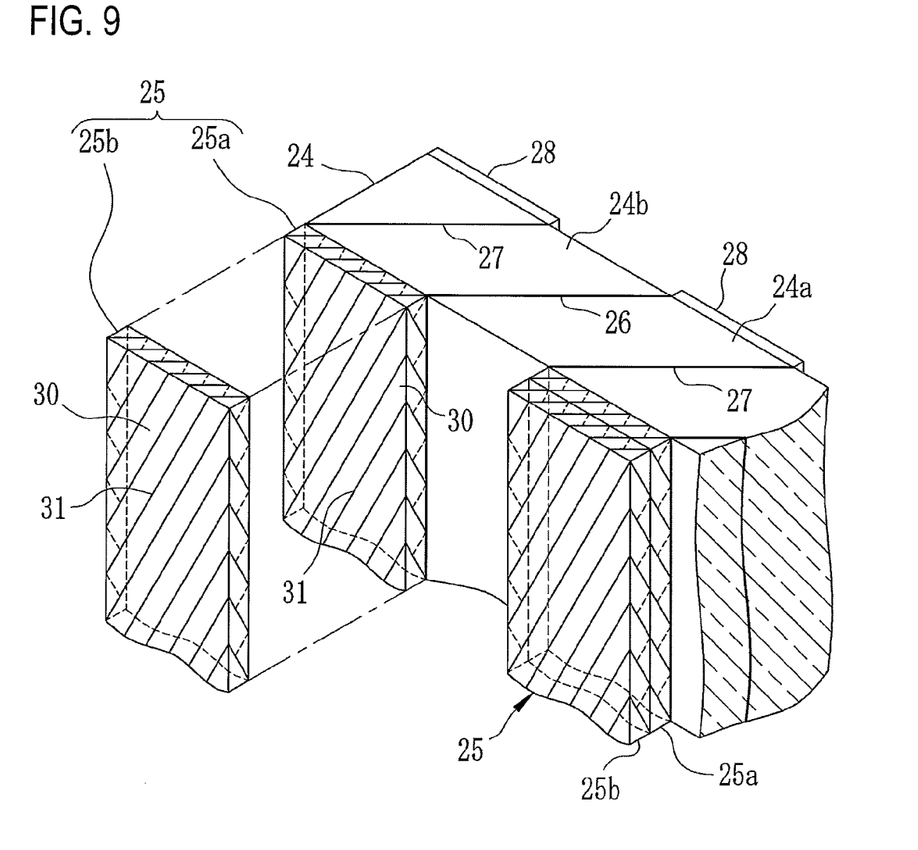
FIG. 9 is a partially broken perspective view showing another example of the polarized illumination optical device.
Figure 10A:
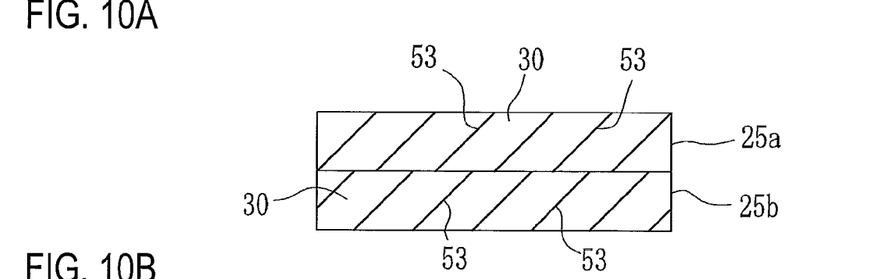
FIGS. 10A and 10B are schematic section views showing an example in which two polarization conversion elements are combined.
Figure 10B:
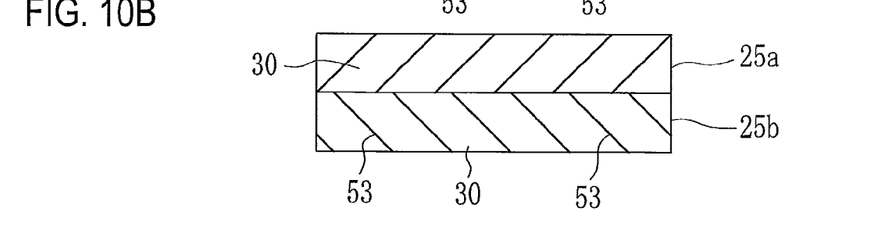

With regard to a way of overlapping the polarization conversion elements 25a and 25b, the bonding borderlines 31 (equivalent to the sections of the retardation films) between the adjacent prism rods 30 may be located so as to match each other as shown in FIG. 9. Alternatively, as shown in FIGS. 10A and 10B, retardation films 53 (equivalent to the bonding borderlines 31) for giving a phase difference of a ¼ wavelength may be shifted from each other or may be perpendicular to each other. In any of the cases, the directions of the optical axes of the retardation films 53 at a time when light is projected onto the incidence surfaces of the polarization conversion devices 25 have an angle of 45° with respect to the polarization direction ((plane of polarization) of linearly polarized incident light. Accordingly, it is possible to rotate the polarization direction of the linearly polarized light by 90° (45°×2) in total.

As described above, in order to rotate the polarization direction 90° using the two polarization conversion elements 25a and 25b in which the retardation films 53 functioning as the ¼ wavelength plates are formed, it is not necessary to make the bonding borderlines 31 of the polarization conversion elements 25a and 25b, which overlap each other, aligned at 45° with respect to the polarization direction of linearly polarized incident light or to set one bonding borderline 31 to 45° and make the other bonding borderline 31 perpendicular to the one bonding borderline 31. For example, in an embodiment shown in FIG. 11, an example is shown in which two prism plates 55a and 55b having the retardation films 53 formed instead of the retardation films 32 of the prism plate 46 shown in FIG. 8C are bonded to each other so that bonding borderlines 56a and 56b between the prism rods 30 cross each other at an angle of θ1-θ2 and are cut along a cut line shown as a broken line shown in FIG. 11. It is used as the polarization conversion device 25.

Figure 11:
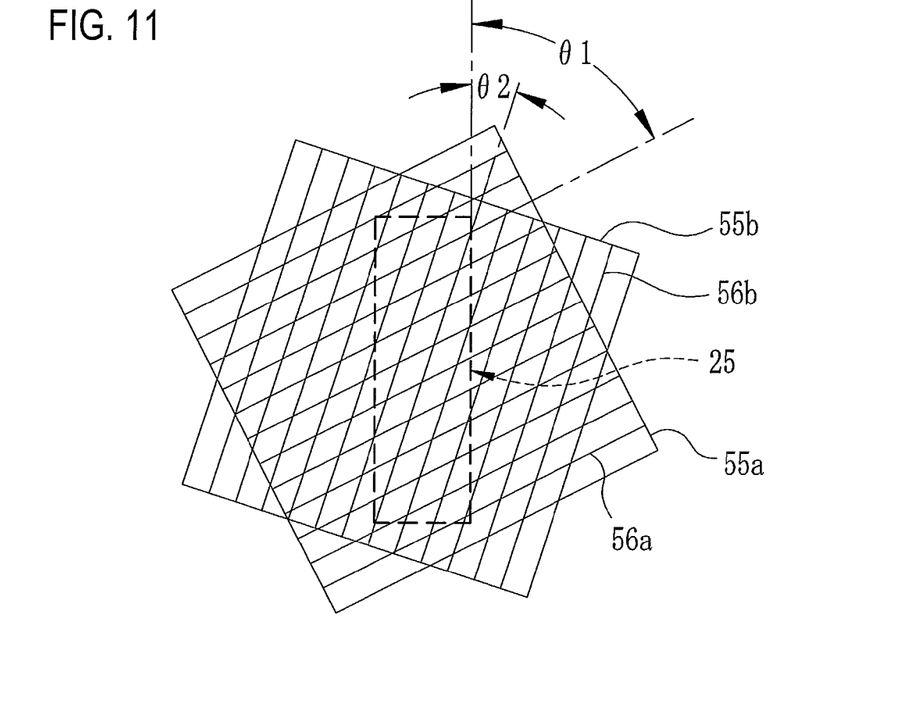
FIG. 11 is an explanatory view of a state where bonding borderlines of two prism plates cross each other.

The cut line shown as the broken line is determined according to the shape of the light emitting surface of the prism rod 24b shown in FIG. 9. None of the bonding borderlines 56a and 56b have an angle of 45° with respect to the polarization direction of linearly polarized light which is incident from the incidence surface of the polarization conversion device 25. That is, the bonding borderline 56a of the prism plate 55a corresponding to the one polarization conversion element 25a is inclined by the angle θ1 with respect to the polarization direction of the linearly polarized light, and the bonding borderline 56b of the other prism plate 55b is inclined by the angle θ2 ,and none of the angles θ1 and θ2 are 45°.

Figure 12:
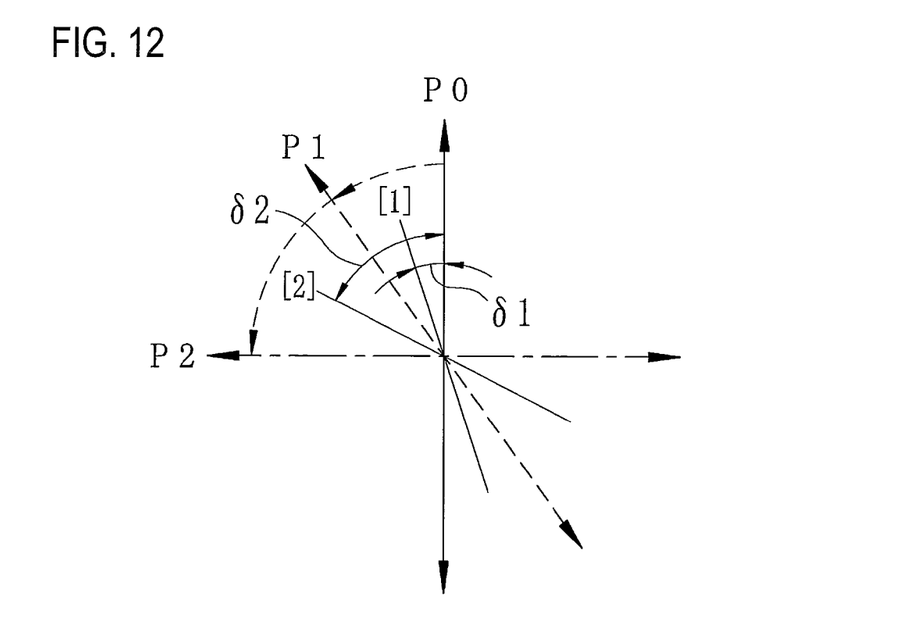
FIG. 12 is a view explaining change in polarization direction by two polarization conversion elements.

It is assumed that linearly polarized light of P-polarized light component whose polarization direction matches a vertical direction is incident on the polarization conversion device 25 cut by the cut line shown in FIG. 11. In this case, an optical axis [1] of the polarization conversion element 25a projected on the incidence surface is perpendicular to the bonding borderline 56a. Accordingly, as shown in FIG. 12, the optical axis [1] is inclined by an angle δ1 (=90°-θ1) counterclockwise from the polarization direction P0. Therefore, the linearly polarized light being incident in the polarization direction P0 is converted into linearly polarized light of the polarization direction P1 which is inclined by 2δ1 in the counterclockwise direction. Also, an optical axis [2] of the other polarization conversion element 25b whose bonding borderline 56b is inclined by the angle θ2 from the vertical direction is similarly inclined by an angle δ2 (=90°-θ2) counterclockwise from the polarization direction P0. Therefore, the polarization direction P1 of the linearly polarized light is further inclined by an angle 2(δ2-δ1) to become linearly polarized light of a polarization direction P2. Accordingly, by determining the values of the angles θ1 and θ2 so that the value of 2δ1+2(δ2-δ1)=2(δ2-δ1), that is, the value of 2(θ1-θ2) becomes 90°, the linearly polarized light of P-polarized light component having the vertical polarization direction is converted into the linearly polarized light of the S-polarized light component having the horizontal polarization direction.

Also, in the case where the polarization conversion elements 25a and 25b are combined in order to rotate by 90° the polarization direction of the linearly polarized light, which is incident as described above, one or both of θ1 and θ2 may be replaced by θ1±n×90° and θ2±n×90°. Also, if the values of the angles θ1 and θ2 are determined so that the relationship of θ1-θ2=45° is eventually met, the polarization conversion device 25 in which the pair of polarization conversion elements 25a and 25b are combined may also be used as a ½ wavelength plate.

Figure 13:
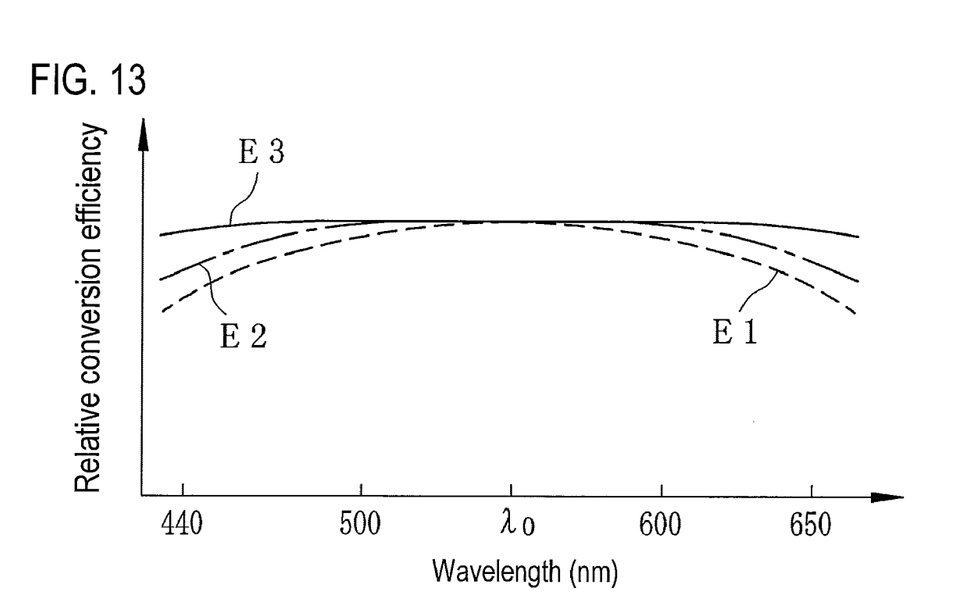
FIG. 13 is a graph showing a tendency of a spectrum conversion efficiency characteristic of a polarization conversion device.

In the case where the two polarization conversion elements 25a and 25b are combined and used as described above, there are following advantages as compared with the above-described embodiment in which the bonding borderlines 31 are inclined by 45°. A relative conversion efficiency characteristic E1 shown by a broken line in FIG. 13 expresses a spectral characteristic when the pair of polarization conversion devices 25 is used in a state of being inclined by 45° as shown in FIG. 4, for example. In this case, the satisfactory conversion efficiency is shown near the design center wavelength $\lambda_O$ of the retardation film 32, but the conversion efficiency is reduced as the wavelength becomes distant from the center wavelength $\lambda_O$. On the other hand, a characteristic E2 is obtained in the polarization conversion device 25 in which the two polarization conversion elements 25a and 25b in FIG. 9 are used in a state where the bonding borderlines 31 have angles of θ1 =55°, θ2=10° with respect to the vertical line. Also, a characteristic E3 is obtained in the polarization conversion device 25 in which the two polarization conversion elements 25a and 25b in FIG. 9 are used in a state where the bonding borderlines 31 have angles of θ1 =63°, θ2=18° with respect to the vertical line. Accordingly, it is confirmed that the wavelength characteristic is improved by the adjustment of θ1 and θ2. Although various values may be set as the values of θ1 and θ2, it can be estimated that the range of 60°≦θ1 ≦70°, 15°≦θ2≦25° is preferable taking symmetry of the spectral characteristic into consideration.

Until now, explanations have been given based on the embodiments shown in the figures. The polarization conversion device of the invention may be appropriately used in a polarized illumination optical device of a liquid crystal projector. In a field related to the polarization, however, it may be required to rotate the polarization direction by 90°according to application. Even in this case, the polarization conversion device 25 may be used as a ½ wavelength plate and may be used as a ¼ wavelength plate by the film thickness adjustment of the retardation film.

What is claimed is:

1. A polarization conversion device comprising:
a prism sheet that includes a plurality of long and narrow prism rods each of which has
an incidence surface,
an emission surface, wherein the incidence surface and the emission surface each other in parallel,
a first side surface continued to the incident surface at an inside angle of 45°, and
a second side surface continued to the emission surface at an inside angle of 45°, wherein the first side surfaces and the second side surfaces are sequentially bonded to each other so that the plurality of prism rods are arranged in parallel; and
retardation films that have optical anisotropy and that are formed of dielectric multilayers being formed on either the first or second side surfaces of the prism rods bonded to each other so that normal lines of the first or second side surfaces substantially match optical axes of the retardation films, wherein
bonding borderlines between the plurality of prism rods are inclined by 45° with respect to a polarization direction of linearly polarized light within a plane perpendicular to an incident optical axis of the linearly polarized light, and
the bonding borderlines are exposed on the incidence surface or emission surface side.

2. The polarization conversion device according to claim 1, wherein
the prism sheet has a rectangular shape, and
the bonding borderlines cross respective sides which form the rectangle shape, at an angle of 45°.

3. A polarization conversion device comprising:
a prism sheet that includes a plurality of long and narrow prism rods each of which has
an incidence surface,
an emission surface, wherein the incidence surface and the emission surface each other in parallel,
a first side surface continued to the incident surface at an inside angle of 45°, and
a second side surface continued to the emission surface at an inside angle of 45°, wherein the first side surfaces and the second side surfaces are sequentially bonded to each other so that the plurality of prism rods are arranged in parallel; and
retardation films which are formed of dielectric multilayers being formed on either the first or second side surfaces of the prism rods bonded to each other so that normal lines of the first or second side surfaces substantially match optical axes of the retardation films, the retardation films having an optical anisotropy that gives a phase difference of a ½wavelength to transmitted light which is vertically incident from the incidence surface, wherein
bonding borderlines between the plurality of prism rods are inclined by 45° with respect to a polarization direction of linearly polarized light within a plane perpendicular to an incident optical axis of the linearly polarized light, and
the bonding borderlines are exposed on the incidence surface or emission surface side.

4. A polarization conversion device comprising:
two polarization conversion elements each of which includes
a prism sheet that includes a plurality of long and narrow prism rods each of which has
an incidence surface,
an emission surface, wherein the incidence surface and the emission surface each other in parallel,
a first side surface continued to the incident surface at an inside angle of 45°, and
a second side surface continued to the emission surface at an inside angle of 45°, wherein the first side surfaces and the second side surfaces are sequentially bonded to each other so that the plurality of prism rods are arranged in parallel; and
retardation films formed of dielectric multilayers that are formed on either the first or second side surfaces of the prism rods bonded to each other so that normal lines of the first or second side surfaces substantially match optical axes of the retardation films, the retardation films having an optical anisotropy that gives a phase difference of a ¼ wavelength to transmitted light which is vertically incident from the incidence surface, wherein
the polarization conversion elements are arranged so that bonding borderlines, of each polarization conversion element, between the plurality of prism rods are inclined by 45° with respect to a polarization direction of the linearly polarized light within a plane perpendicular to an incident optical axis of the linearly polarized light.

5. A polarization conversion device comprising:
two polarization conversion elements each of which includes
a prism sheet that includes a plurality of long and narrow prism rods each of which has
an incidence surface,
an emission surface, wherein the incidence surface and the emission surface each other in parallel,
a first side surface continued to the incident surface at an inside angle of 45°, and
a second side surface continued to the emission surface at an inside angle of 45°, wherein the first side surfaces and the second side surfaces are sequentially bonded to each other so that the plurality of prism rods are arranged in parallel; and
retardation films formed of dielectric multilayers that are formed on either the first or second side surfaces of the prism rods bonded to each other so that normal lines of the first or second side surfaces substantially match optical axes of the retardation films, the retardation films having an optical anisotropy that gives a phase difference of a ¼ wavelength to transmitted light which is vertically incident from the incidence surface, wherein
one of the polarization conversion elements is arranged so that bonding borderlines thereof between the plurality of prism rods are inclined by an angle of $\theta 1$ with respect to a polarization direction of the linearly polarized light within a plane perpendicular to an incident optical axis of the linearly polarized light,
the other polarization conversion element is arranged so that bonding borderlines thereof between the plurality of prism rods are inclined by an angle of $\theta 2$ with respect to the polarization direction of the linearly polarized light within the plane perpendicular to the incident optical axis of the linearly polarized light, and
$2(\theta 2-\theta 1)$ is substantially equal to 90°.

6. The polarization conversion device according to claim 5, wherein $60° \leq \theta 1 \leq 70°$, and $15° \leq \theta 2 \leq 25°$.

7. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
the polarization conversion device according to claim 3 that is bonded to an emission surface of the polarized beam splitter from which the other linearly polarized light beam reflected by the polarizing split layer is emitted, wherein
non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

8. The polarized illumination optical device according to claim 7, wherein the plurality of polarized beam splitters having the polarization conversion devices bonded to the emission surfaces thereof are arranged so that the polarization conversion devices are parallel to each other on the same plane.

9. A liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 7 that is provided immediately after an emission surface of the pair of microlens arrays.

10. A liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 8 that is provided immediately after an emission surface of the pair of microlens arrays.

11. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
the polarization conversion device according to claim 4 that is bonded to an emission surface of the polarized beam splitter from which the other linearly polarized light beam reflected by the polarizing split layer is emitted, wherein
non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

12. The polarized illumination optical device according to claim 11, wherein the plurality of polarized beam splitters having the polarization conversion devices bonded to the emission surfaces thereof are arranged so that the polarization conversion devices are parallel to each other on the same plane.

13. A liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 11 that is provided immediately after an emission surface of the pair of microlens arrays.

14. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and
the polarization conversion device according to claim 5 that is bonded to an emission surface of the polarized beam splitter from which the other linearly polarized light beam reflected by the polarizing split layer is emitted, wherein
non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

15. The polarized illumination optical device according to claim 14, wherein the plurality of polarized beam splitters having the polarization conversion devices bonded to the emission surfaces thereof are arranged so that the polarization conversion devices are parallel to each other on the same plane.

16. A liquid crystal projector comprising:
an illumination optical system that divides illumination light from a light source lamp using a pair of microlens arrays, in which a plurality of microlenses is arranged, and that emits the divided illumination light beams so as to be superimposed on a liquid crystal display panel; and
the polarized illumination optical device according to claim 14 that is provided immediately after an emission surface of the pair of microlens arrays.

17. A polarized illumination optical device comprising:
a polarized beam splitter including a polarizing split layer on a bonding surface between prisms, the polarized beam splitter that transmits one of first and second linearly polarized light beams whose polarization directions are perpendicular to each other, out of non-polarized light beams incident on the polarizing split layer, the polarized beam splitter that reflects the other of the first and second linearly polarized light beams; and the polarization conversion device according to claim 6 that is bonded to an emission surface of the polarized beam splitter from which the other linearly polarized light beam reflected by the polarizing split layer is emitted, wherein non-polarized light beams being incident on the polarized beam splitter from an illumination light source is converted into polarized illumination light consisting of (i) the one linearly polarized light beam, which is transmitted through the polarizing split layer, and (ii) the other linearly polarized light beam, which is reflected by the polarizing split layer and whose polarization direction is rotated by 90° after being transmitted through the polarization conversion device.

18. The polarized illumination optical device according to claim 17, wherein the plurality of polarized beam splitters having the polarization conversion devices bonded to the emission surfaces thereof are arranged so that the polarization conversion devices are parallel to each other on the same plane.

19. A liquid crystal projector comprising:

an illumination optical system that divides illumination light from a light source lamp using a pair of microlens arrays, in which a plurality of microlenses is arranged, and that emits the divided illumination light beams so as to be superimposed on a liquid crystal display panel; and the polarized illumination optical device according to claim 17 that is provided immediately after an emission surface of the pair of microlens arrays.

20. A liquid crystal projector comprising:

an illumination optical system that divides illumination light from a light source lamp using a pair of microlens arrays, in which a plurality of microlenses is arranged, and that emits the divided illumination light beams so as to be superimposed on a liquid crystal display panel; and the polarized illumination optical device according to claim 18 that is provided immediately after an emission surface of the pair of microlens arrays.

* * * * *